D. BARNUM.

Sewing Machine Guide.

No. 2,163. Reissued Jan. 30, 1866.

Witnesses

O. F. Barnum

E. B. Barnum

Inventor

Daniel Barnum

N. PETERS, Photo-Lithographer, Washington, D. C.

UNITED STATES PATENT OFFICE.

DANIEL BARNUM, OF NEW YORK, N. Y.

IMPROVEMENT IN SEWING-MACHINE GUIDES.

Specification forming part of Letters Patent No. 31,366, dated February 12, 1861; Reissue No. 1,760, dated September 13, 1864; Reissue No. 2,163, dated January 30, 1866.

*To all whom it may concern:*

Be it known that I, DANIEL BARNUM, of New York, in the county and State of New York, have invented a new and useful improvement for automatically maintaining a smooth surface and guiding soft flexible material to a sewing-machine needle for sewing seams, tucks, hems, &c., which I denominate a "self-sewer" or "automatic guide" for sewing-machines; and I do hereby declare the following to be a full and clear description of the same, reference being had to the drawings, and to the letters of reference thereon, which make part of this specification.

Figure 1:
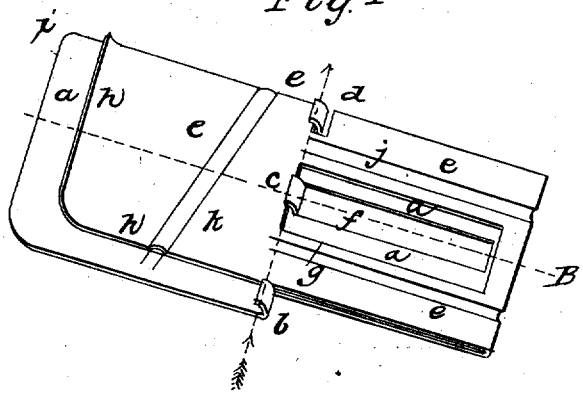
Figure 2:
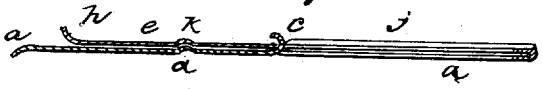

Figure 1 is a perspective plan view, exhibiting the improvement as of one piece of thin spring sheet metal. Fig. 2 is a section through the line A B.

It is well known that in sewing light and frail textures and fine goods with the ordinary sewing-machine gage it requires great care even with skilled operators to keep the surface of the material smooth and prevent the same from doubling or crimping up between the needle and the gage, as well as outside of and around the needle, and thus to secure straight seams and even widths of tucks, hems, &c., and especially is this the case with the unskillful and inexperienced.

My improvements are intended to obviate all these difficultles, and to enable ladies of limited experience to use their sewing-machines with satisfactory results to themselves, and to do away with the necessity for the close application and watchfulness heretofore so painful to the eyes and hurtful to the backs and limbs of many who have taken great delight in using the sewing-machine, but who have found it thus injurious and hurtful under close application.

The nature of my invention consists in making and combining with a sewing-machine gage on the outside of the gaging-line an upper automatic clamping or self-adapting surface of thin sheet or light elastic metal, and extending the same out from the gaging-line over an under supporting or resisting surface beyond the line of seam formed by the needle, and thereby producing an automatic spring-gage for sewing seams, tucks, hems, &c., and by which automatic spring-like action a gentle self-adapting pressure is applied to the upper side of the material as it passes over the under supporting-surface in approaching the needle to be sewed, whereby the material is made smooth and held without basting outside of and around the needle, as well as between it and the gage which guides the edge of the cloth, and thereby preventing the same from doubling or crumpling or rising up over the gage, and thus insuring straight and even seams, tucks, hems, &c. The spring or elastic metal must be so light that the upper clamping-surface will readily yield and adapt itself to any inequalities in the thickness of the material—such as seams or folds for tucks, &c.—and permit the same to pass freely under the upper clamping-surface without materially changing the pressure or clamping-power of the spring or interfering with the feeding apparatus. It will readily be seen that this easy range or extent of motion and delicacy of spring-pressure can only be obtained from very light elastic metal on the upper clamping-spring.

My invention also consists in the use of thin sheet metal for the clamping-surfaces, in conjunction with striking or turning the thin edges thereof up, and thus forming inclined or beveled surfaces to facilitate an easy entrance of the material between the upper clamping-surface and the under supporting-surface, whether the said material be of even thicknesses or of unequal surfaces, thus allowing seams and other inequalities to pass freely through the machine, while the upper clamping-surface will readily and automatically adapt itself thereto.

My invention also consists in providing the thin metal clamping-surfaces with diagonal corrugations struck up thereon outside of the needle and the gage which guides the edge of the cloth, whereby the material is automatically inclined as it moves between the upper clamping-surface and the under supporting-surface toward and against the gage, the whole constituting an automatic self-guiding gage for sewing-machines.

To enable others to make and use my invention, I refer to the drawings, and to the letters of reference marked thereon, which show all the various parts to be constructed from one piece of thin elastic spring metal, with the gaging-lips cut out and turned up from the under supporting or clamping plate, *a*, in which is found the fastening and adjusting slot, and immediately above and around this slot is formed a large slot in the upper clamping-spring, this enlarged slot being designed to give entire freedom to the upper or automatic spring by allowing it to work around the fastening-screw.

*a* is the under clamping or supporting bed-piece of the gage, which, when fastened to the cloth-plate of the machine for use, lies on said cloth-plate and becomes practically rigid and unyielding.

*b*, *c*, and *d* represent three gaging-lips cut out and turned up from *a*, through holes cut in the upper clamping or automatic spring, *e*, so as to form a gage for the edge of the material to run against, and as the under plate, *a*, lies on the cloth-plate when in use, and becomes rigid and unyielding, it will be seen that the whole of the automatic clamping and yielding action results from the elasticity of the upper clamping spring, *e*. It is not material that more than two gaging-lips should be used.

*f* is the fastening and adjusting slot in *a*, and *g* is the larger slot in *e*.

*h* shows the front edge of the upper clamping-surface turned up, and presents a beveled or curved edge or inclined surface to the advancing material for facilitating the entrance of unequal thicknesses or surfaces of material under the upper clamping-surface, and for this purpose also the projecting edges of *a* are deflected downward from the lip *b* around the corner *i*, and thus presenting reverse beveled or curved edges, between which the material finds an easy entrance under the upper automatic clamping-surface.

*j* shows a male and female corrugation in both *a* and *e*. These may be so arranged as to give increased strength to any portion of *a* or *e*, and thus to enable me to use very thin metal, and by that means to secure the utmost delicacy of pressure as well as any required range of motion and elasticity. These are features which are necessary to the success of the improvement; but they are not attainable with thick or rigid metal.

At *k* are seen diagonal corrugations stamped or pressed into and across both the upper and under clamping surfaces, which, acting in conjunction with the gage and thin elastic or spring metal, constitute a self-adapting gage and guide for automatically pressing upon the upper side of the material, and thus smoothing and holding and guiding the material without basting, preparatory to sewing straight and even seams, tucks, hems, &c. The corrugations should be struck from the under side of *a*, so that it will be flat on the cloth-plate of the machine when applied thereto for use. It then becomes a bed-piece or cloth-supporter under the upper automatic clamping-surface. The upper side may be beautified by making the corrugations in the form of beads. The diagonal corrugations should be made within an angle of forty-five degrees with the line of the gage, although this angle may be varied without materially changing the result. The material is to be fed in under the upper clamping-surface and over the under supporting-surface or bed-piece, when the diagonal corrugations will incline the same automatically toward the gaging-lips and deliver the portion to be sewed to the needle correctly, the gage being so placed that the needle or pressure pad comes just up to the delivery side of the gage, as seen at *l*. It may be stated that the extension of the upper automatic clamping-surface beyond the needle, and the gentle automatic pressure produced thereby on the material outside of the line of the seam, acting in conjunction with the feeding apparatus, also tend to automatically incline the material toward and against the gaging-lips without the intervention of diagonal corrugations, although the said corrugations are material aids and are preferred.

It will be obvious that the gage may be made of two pieces riveted together, and that the lips may be made of pins or studs and attached to the under plate, *a*, and that the form may be varied without materially changing the principle of my invention.

It will be obvious also that the delicacy of spring and range or extent of motion required to accommodate varying thicknesses and uneven surfaces cannot be obtained with thick or rigid metal springs; nor can the use of a set-screw to adapt or adjust the pressure of a rigid clamping-surface attain the end, secured by the automatic spring-clamping surface of thin sheet metal, heretofore fully described. I remark that while these important results are produced by the use of thin spring metal alone, a further advantage is realized from such use in the facility of manufacture as well as in the cost of construction which it affords compared with any or all other forms of sewing-gages. I remark, further, that when the gage is applied to a sewing-machine for use the under clamping-surface, *a*, will lie nearly flat on the plate of the machine, and thereby become practically a rigid supporting-surface for the cloth to rest on while passing under the upper automatic self-adjusting surface. Consequently the whole of the smoothing, holding, and guiding action will result from the automatic action of the upper clamping-spring, *e*.

Having thus fully described my invention, and shown some of the modes of applying and constructing and using the same, I remark that I do not claim to have invented diagonal clamps, merely as such; nor do I claim the use of thin sheet or light spring metal, except as and for the purposes herein set forth and claimed as new in forming automatic clamping-surfaces outside of the needle and gage, and in the combinations specified, as and for the purposes specified.

What I do claim as new and of my invention, and which I desire to secure by Letters Patent of the United States, is as follows, to wit:

1. The use of thin sheet or light elastic spring metal for making automatic clamping-surfaces extending out from the gaging-line of a sewing-machine gage, and in combination therewith, beyond the line of seam to be sewed by a needle, and of thus producing a gentle automatic spring-pressure upon the upper surface of flexible material while the same is approaching the needle, and thereby automatically smoothing and holding the said material preparatory to its being sewed, outside of the line of seam as well as between it and the line of gage, substantially as and for the purposes specified.

2. The use of thin sheet or light elastic spring metal for making automatic clamping-spring surfaces, as specified, when provided with diagonal corrugations struck up thereon outside of the line of the seam to be sewed by a sewing-machine needle, substantially as and for the purposes specified.

3. The use of thin sheet or light elastic spring metal for making automatic clamping-surfaces, as specified, when provided with the beveled edges, which are turned or struck up, as described, to facilitate an easy entrance of varying thicknesses and uneven surfaces of material under the upper clamping-surface, substantially as and for the purposes specified.

4. A sewing-machine gage having an upper automatic gently-clamping surface in front of the gaging-line, which surface, when made on a sewing-machine, will extend over and automatically press upon the upper side of the material which is being sewed, beyond the line of the seam as well as between it and the gage, whether said material be of equal or of unequal thickness.

5. By the use of the means mentioned in the last preceding clause, automatically-removing the wrinkles from and smoothing the upper side of any soft or undressed woven fabric of unequal thickness or of uneven surface, and holding and guiding the same, without basting, while it is approaching the needle, and being sewed both outside of and around the needle, as well as between it and the gage, substantially as and for the purposes specified.

DANIEL BARNUM.

Witnesses:
E. B. BARNUM,
JOANNA BARNUM.